May 23, 1944.  L. TEPLOW  2,349,778
ADJUSTABLE THROW GYRATING MECHANISM
Filed July 30, 1942
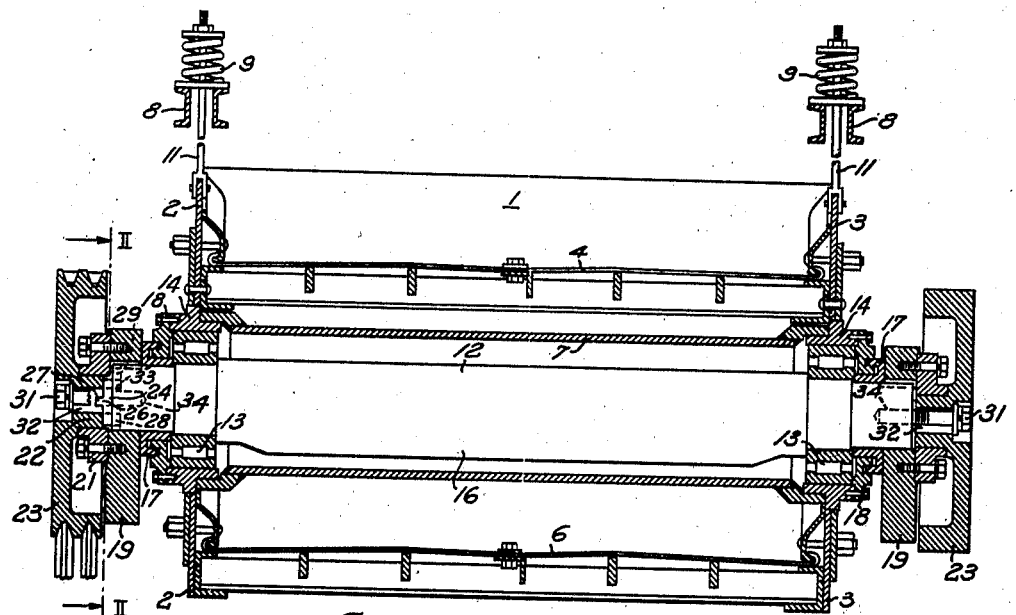
Fig. 1
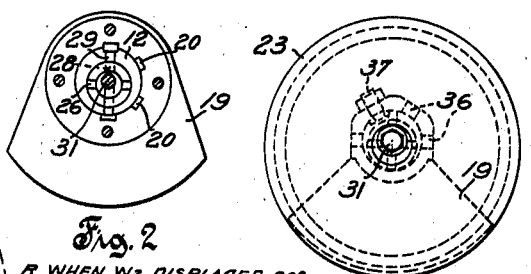
Fig. 2
Fig. 5
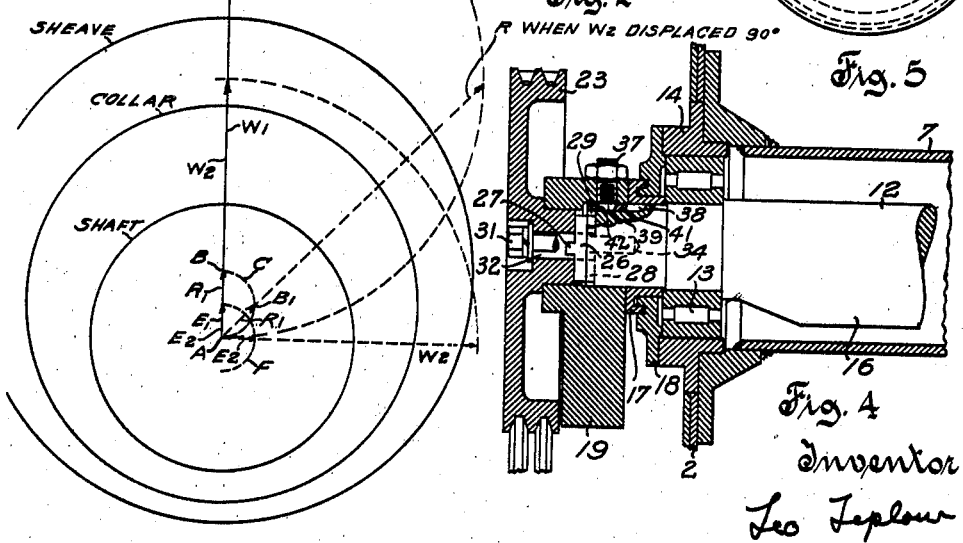
Fig. 3
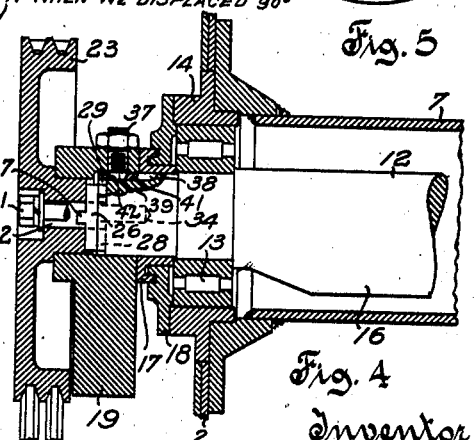
Fig. 4
Inventor
Leo Teplow
by K.S. Wyman
Attorney Patented May 23, 1944

2,349,778

UNITED STATES PATENT OFFICE 2,349,778

ADJUSTABLE THROW GYRATING MECHANISM

Leo Teplow, Milwaukee, Wis., assignor to Allis-Chalmers Manufacturing Company, Milwaukee, Wis., a corporation of Delaware Application July 30, 1942, Serial No. 452,837

9 Claims. (Cl. 74—61)

This invention relates generally to vibrating apparatus and more particularly to mechanism operative to vibrate an associated structure with selected degrees of amplitude by means of a rotary element embodying angularly displaceable eccentric masses effective to vary the center of mass and thereby its axis of gyration.

The invention is particularly applicable, although in no manner limited, as an actuating means for vibrating screens and the like in which it is often desirable and sometimes necessary to vary the amplitude of the vibrations in accordance with the nature of the material undergoing treatment. In such applications, the axis of the rotary element, which is usually a pulley driven shaft provided with angularly displaceable eccentric masses for varying its center of mass, must be maintained in substantial coincidence with its center of mass during normal operation in order to provide a smooth drive and prevent excessive wear and strain on the driving and driven parts.

In this connection, it has heretofore been proposed to employ a concentric pulley driven shaft mounted for rotation and lateral displacement within a pair of spaced, coaxial annular bearings on the structure to be vibrated by means of pairs of inner and outer angularly displaceable counter weighted eccentric rings or balance wheels which are connected and mounted for rotation as units on the outer periphery of said bearings and which have the outer wheel of each pair provided with a central hub portion secured to the adjacent end of said shaft. This known construction provides means for varying the effective eccentricity of the masses by angularly displacing said eccentric rings and the eccentricity of said rings is such that the axis of said shaft is always maintained in substantial coincidence with its center of mass. However, said known construction is objectionable in that it necessitates employing overhung bearing supports and extremely large bearings which is conducive to excessive local vibration and materially increases manufacturing installation and maintenance costs, and in that a relative angular displacement of said eccentric wheels is difficult and time consuming since the driven shaft, which is quite massive, is also displaced.

In this connection, it has also been proposed to employ an eccentrically counterweighted driven shaft which is rotatably mounted in axially spaced bearings concentrically disposed in the structure to be vibrated and to rotate said shaft by means of a driven pulley which is mounted for coaxial rotation on a fixed structure and which is drivingly connected (1) with an intermediate balance wheel carrying portion of said shaft by means of an intermediate transmission plate having pin and slot connections with slots and pins provided in the opposed faces of said flywheel and pulley, respectively, thereby permitting translatory movement between said shaft and pulley and (2) with the adjacent end of said shaft by means of an annular element connected to rotate coaxially with said pulley and connected with said end of the shaft by pivotal links permitting translatory movement between said end of the shaft and said element. This known construction provides for varying the effective eccentric mass by the addition or removal of weights and since the pulley axis is fixed, it also provides a smooth drive. However, this known structure is also objectionable in that no means are provided for reducing the eccentric mass effect of the flywheels except by replacing same with lighter wheels, and in that said construction requires two additional bearings, one for the pulley and one for the element which rotates coaxially with said pulley and additional features such as the pin and link connections which materially increases manufacturing, installation and maintenance costs.

It is therefore the object of this invention to provide an improved mechanism embodying a rotatable element and angularly displaceable eccentric masses which is operative to vibrate an associated structure with selected degrees of amplitude and which will eliminate the aforementioned defects of the heretofore known constructions by effecting one or more of the following results and/or advantages: (1) eliminate the use of overhung bearings and reduce the size and/or the number of the bearings; (2) position and maintain the driven pulley drivingly connected with the rotary element with the center of the pulley in substantial coincidence with the center of mass of the rotary element as determined by the relative positions of the eccentric masses, thereby providing a smooth drive; (3) facilitate relative angular displacement of the eccentric masses and thereby a translation of the driven pulley to a position in substantial coincidence with the new center of mass; and (4) produce a more compact, simplified and durable construction.

In accordance with this invention, one or more of the aforementioned results and/or advantages may be obtained by a construction embodying a shaft supported for rotation in a structure adapted to be vibrated, eccentric weights carried by said shaft for relative angular adjustment thereon, a pulley connected with said shaft for relative translatory movement transversely to the axis of the shaft and for rotating said shaft as said pulley is turned, and compound eccentric means rendering the angular adjustment of one of said eccentric weights effective to translate said pulley relative to said shaft and to a position in which the center of the pulley is in substantial coincidence with the center of mass.

The invention accordingly consists of the various features of construction, combinations of elements and arrangements of parts as more fully set out in the appended claims and in the detailed description, reference being had to the accompanying drawing, in which:

Fig. 1 illustrates a vibrating screen drive embodying the invention;

Fig. 2 is a partial section taken on line II—II of Fig. 1;

Fig. 3 graphically illustrates the locus of the center of mass and the locus of the resulting or effective centrifugal force produced by angularly adjusting one eccentric weight in a clockwise direction through an angle of 180° from an in-phase position relative to the other eccentric weight;

Fig. 4 illustrates a modified construction embodying the invention; and

Fig. 5 is a partial end view of the structure shown in Fig. 4.

Referring to Fig. 1, it is seen that the invention is applied to a vibrating screen embodying a frame formed by side walls 2 and 3, an upper deck structure 4, a lower deck structure 6, and an intermediate roller bearing spacer pipe or tube 7. The frame is suspended for gyratory movement from a plurality of fixed, spaced supports 8 by means of compression springs 9 and interconnecting rods 11. The frame construction and the manner in which it is mounted are conventional and a further description in this connection is unnecessary for a complete understanding of the present invention.

A drive shaft 12 extends through the tube 7 and is rotatably mounted in opposed portions of the side walls 2 and 3 by means of conventional roller bearings 13 disposed in bearing housings 14 carried by said opposed wall portions. In this connection, it should be noted that each bearing and its housing are supported by a side wall portion in substantially symmetrical relation with respect to the opposite sides of said wall portion thereby eliminating the shear stresses inherently set up in the frame side walls by an overhung bearing structure. Shaft 12 embodies an eccentric mass or weight 16 intermediate its bearing supported end portions and said end portions and the portions which project outwardly beyond said bearings are concentric with respect to each other and with respect to the bearings and bearing housings. Mounted on the portion of shaft 12 adjacent the outer surface of each bearing is a bearing retaining and seal collar 17 which coacts with an interposed seal plate 18 removably mounted on the adjacent bearing housing 14.

Each end of shaft 12 has keyed thereon an eccentrically weighted wheel 19 which has (see Fig. 2) a plurality of circumferentially spaced keyways 20 formed in the inner surface of its hub portion to permit said wheel being mounted on said shaft in different angular positions in order to vary the resultant of the centrifugal forces produced by the eccentric weights embodied in the shaft and wheel. Each wheel 19 includes an eccentrically bored portion or collar 21 which projects beyond the adjacent end of the shaft 12 and has mounted therein an eccentric hub portion 22 of the pulley or sheave 23. In the construction shown, the function of the ungrooved pulley 23 disposed on the right-hand end of the shaft is to balance the grooved driving pulley. The hub portion 22, which may be formed integral with the grooved pulley 23 as shown, is drivingly connected with the adjacent end of the shaft 12 for translatory, but not angular, movement relative thereto by means of a coupling element 24 having on one face thereof a diametral rib 26 disposed in a conforming slot 27 extending entirely across the shaft end of the pulley hub and having on its other face a similar diametral rib 28 which is disposed at right angles with respect to the rib 26 and which is disposed within a conforming slot 29 extending entirely across the adjacent end of the shaft 12. The pulley is maintained in driving engagement with the shaft 12 by means of a retaining cap screw 31 which extends through alined bores 32 and 33 in the pulley and coupling element, respectively, and into the threaded coaxial bore 34 in the adjacent end of the shaft 12, and it should be obvious that if the grooved pulley is turned, the pulley, the wheels 19, the collar 21 and the shaft 12, which is rotatably supported in the bearings 13, rotate as a unit.

The collar 21 and the hub 22 are combined to form a compound eccentric of which one eccentric, the collar 21, can be angularly adjusted relative to the other eccentric, the hub 22, and relative to the shaft 12; such adjustment of the grooved pulley in this case being effected by removing the pulley and the wheel from the shaft, by turning the wheel 19 on the hub portion 22 until the selected keyway 20 (see Fig. 2) is positioned for alinement with the keyway in the shaft 12, and by then replacing the pulley and wheel on the shaft. A similar adjustment of the ungrooved pulley can be effected merely by loosening cap screw 31, and turning wheel 19; the enlarged bore 32 permitting its displacement. A similar turning of wheels 19 and collars 21 on the pulley hubs 22 angularly displaces the wheels 19 and thereby their eccentric masses relative to the eccentric mass 16 on the shaft 12 and translates the center of the grooved pulley relative to the adjacent end of the shaft and to a position determined by the vector sum of the eccentricities of the hub and collar bore. The grooved pulley is rendered free for translation or translatory movement in response to any and all relative angular adjustments of its associated eccentrics by making the diameters of the bores 32 and 33 sufficiently greater than the diameter of cap screw 31 and the diameter of the coupling element 24 sufficiently less than the diameter of the pulley hub 22, to permit the maximum displacement which can be effected by said eccentrics.

Rotation of a freely supported shaft or the like embodying an eccentric weight or a plurality of angularly displaced eccentric weights produces a resultant, unbalanced, revolving centrifugal force which always acts along a straight line extending from the center of rotation through the center of mass and causes the shaft and its associated structure to gyrate about the center of mass. The addition of an eccentric weight or of a plurality of angularly displaced eccentric weights to a rotatably supported concentric shaft results in the center of mass of the shaft being displaced from the center of rotation along the line of action of the resultant unbalanced centrifugal force a distance proportional to the combined effect of said weights. Therefore, since the center of mass of a rotating gyrating body is the only fixed point thereon, it is essential, in order to obtain a smooth drive, to place and maintain the center of the pulley which is drivingly connected with said shaft in substantial coincidence with the center of mass for all positions of said eccentric weights. In order to accomplish this result, the eccentricity of the bore in the collar portion 21 of wheels 19 and the eccentricity of the hub portion 22 of pulleys 23 are each made proportional in magnitude to the mass of a different one of the eccentric weights, i. e., the magnitude of one eccentric is made proportional to the eccentric mass 16 which is fixed on the shaft 12 and the magnitude of the other eccentric is made proportional to the eccentric masses on the angularly adjustable wheels 19, and the collar and hub portion are combined to produce a net eccentricity which is proportional in magnitude and corresponds in direction to the magnitude and direction of the resultant of the centrifugal forces produced by said eccentric weights for all positions thereof. Stated differently, the bore in the collar portion 21 of wheels 19 and the hub portion 22 of pulleys 23 are combined to form a compound eccentric having a net eccentricity proportional to the resultant of the centrifugal forces produced by the eccentric weights, i. e., the eccentric masses embodied in the wheels 19 and shaft 12, for all positions thereof.

As shown in Fig. 1, the position of the eccentrically weighted wheels 19 is such that during normal rotation, the resultant unbalanced centrifugal force W2, acts in phase with the unbalanced centrifugal force, W1, produced by the eccentric mass 16 fixed on the shaft 12. The resultant unbalanced centrifugal force, R, acting to gyrate the structure is always equal to the vector sum of the forces W1 and W2 and when said forces are equal and in phase, the resultant is equal to 2W1 or 2W2 as indicated by the full line vectors W1, W2 and R in Fig. 3. Referring again to Fig. 3, which graphically illustrates and exaggerates the results obtained by a relative angular adjustment of the eccentric weights producing the equal force vectors W1 and W2, it is seen that when the wheels 19 are positioned on the shaft 12 to bring the force vector W2 in phase with the force vector W1 (assuming that the shaft 12, wheels 19 and pulley 23 have first been turned as a unit through an angle 180° from the position shown in Fig. 1), the result is a displacement of the center of mass from point A to point B; that as the wheels 19 are angularly adjusted on shaft 12 to cause force vector W2 to move clockwise through an angle of 180° from its full line position, the locus of the resultant or effective gyrating force R equals the vector sum of W1 plus W2, is represented by dotted line curve G, the locus of the center of mass is represented by dotted line curve C and the locus of the center of the eccentric bore in the collar 21 is represented by dotted line curve F; that if the center of the pulley 23 is to be in substantial coincidence with the center of mass, i. e., the axis of gyration of the rotating element, for all positions of the eccentric weights, the locus of the net or resultant eccentrically R1 equals the vector sum of E1, the eccentrically of the bore in collar 21, and E2, the eccentricity of the pulley hub 22, must coincide with the locus of the center of mass; and that when the force vectors W1 and W2 are equal, the eccentricity vectors E1 and E2 must be equal and proportional in magnitude to the force vectors. The results obtained by a clockwise movement of the wheels 19 through an angle of 90° from the position shown in Fig. 1, assuming that the shaft 12, wheels 19 and pulley 23 have first been turned as a unit through an angle of 180°, is clearly illustrated by the dotted line vectors W2, R, E2, and R1.

It should therefore be obvious that with the eccentric weights positioned as indicated in Fig. 1, the center of the bearing end of the shaft 12, the bearings 13, the bearing housing 14 and the structure associated therewith will gyrate about an axis coincident with point B, the center of mass, with a radius of gyration equal to AB; that the center of the pulley 23 will coincide with the point or center B; and that therefore the pulley rotates on a fixed point, the center of mass B, thereby effecting a smooth drive. The same is true for all positions of the eccentric weights since the eccentricity of the bore in the collar 21 and the eccentricity of the pulley hub 22 are such that the net or resultant eccentricity R1 effects a translatory movement of the pulley transversely to the axis of the shaft to a position in which its center is in substantial coincidence with the new center of mass. For example, when the wheels 19 are moved clockwise through an angle of 90° as shown in Fig. 3, the new center of mass is B1 and the structure gyrates about an axis coincident with said center with a radius of gyration equal to AB, and when the wheels 19 are moved through an angle of 180°, the center of mass is coincident with point A, the axis of the bearings or the axis of the bearing ends of the shaft 12, and no gyration occurs since the structure is dynamically balanced, i. e., the unbalanced centrifugal forces W1 and W2 are equal and opposite. However, if the eccentrically weighted wheels 19 and the eccentric mass 16 do not produce equal effects, i. e., equal unbalanced centrifual forces, a displacement of the wheels 19 through an angle of 180° will not effect a dynamic balance and consequently the structure will continue to gyrate about an axis coincident with the center of mass, with a minimum radius of gyration proportional to the effective or resultant unbalanced centrifugal force R.

Referring to the modified construction shown in Figs. 4 and 5 in which like numerals are used to designate the same or similar parts, it is seen that this construction will afford all of the advantages inherent in the construction shown in Figs. 1 and 2 and differs therefrom only in the manner in which the wheels 19 associated with the grooved pulley 23 are secured for angular adjustment on the bearing end of the shaft 12. In this modification, the hub portion of the wheels 19 is provided with a circumferential series of tapped radial holes 36 and the wheels are secured to the shaft 12 by means of a cap screw 37 which may be disposed in any of said holes and turned to project into the slot or the like 38 provided in the shaft 12. If a slot is used, it is preferable to employ a cap screw having an unthreaded tapered end portion 39 and a filler piece 41 which is disposed in said slot and has an opening 42 therein conforming with the shape of the unthreaded end portion of the cap screw as shown.

The primary advantage of the modified construction is that it permits an angular adjustment of the wheels, 19 and thereby a translation of the pulley 23 relative to the end of the shaft 12 without first removing the wheels and the pulley from said shaft.

The invention is applicable to any mechanism operative to vibrate an associated structure with selected degrees of amplitude by means of a rotary element embodying angularly displaceable eccentric masses effective to displace its center of mass or its axis of gyration relative to the axis of rotation, and although the invention is illustrated as applied to a double deck vibrating screen embodying a rotatable shaft supported by two axially spaced bearings, it should be understood that the invention is also applicable to elements rotatably supported by only a single bearing and that it is not intended to limit the invention to the exact details of construction herein shown and described as various modifications within the scope of the appended claims may occur to persons skilled in the art.

It is claimed and desired to secure by Letters Patent:

1. Gyrating mechanism comprising a shaft rotatably supported in a structure adapted to be gyrated, eccentric weights carried by said shaft for relative angular adjustment thereon, a pulley connected with said shaft for translatory movement relative thereto and for rotating said shaft as said pulley is turned, and compound eccentric means rendering the angular adjustment of one of said eccentric weights effective to translate said pulley relative to said shaft and to a position in which the center of the pulley is in substantial coincidence with the axis about which the shaft will gyrate when rotated.

2. Gyrating mechanism comprising a shaft rotatably supported in a structure adapted to be gyrated, eccentric weights carried by said shaft for relative angular adjustment thereon, a pulley connected with said shaft for translatory movement relative thereto and for rotating said shaft as said pulley is turned, and compound eccentric means rendering the angular adjustment of one of said eccentric weights effective to translate said pulley relative to said shaft, said compound eccentric means having a net eccentricity proportional to the resultant of the centrifugal forces produced by said eccentric weights whereby the center of the pulley is maintained in substantial coincidence with the axis about which the shaft will gyrate for all positions of said weights.

3. Gyrating mechanism comprising a shaft rotatably supported in a structure to be gyrated and having an eccentric weight thereon, an eccentrically weighted member carried by said shaft for relative angular adjustment thereon, a pulley carrying member connected with an end of said shaft for translatory movement relative thereto and for rotating said shaft as said pulley is turned, and a compound eccentric having a net eccentricity proportional to the resultant of the centrifugal forces produced by said eccentric weights for all positions thereof, said eccentrics interconnecting said members and rendering the angular adjustment of said eccentrically weighted member effective to translate said pulley relative to said shaft and to a position in which the center of the pulley is in substantial coincidence with the axis about which the shaft will gyrate when rotated as determined by said eccentric weights when in any of said positions.

4. Gyrating mechanism comprising an eccentrically weighted shaft rotatably mounted in a structure adapted to be gyrated, and a compound eccentric disposed on an end portion of said shaft and including an eccentrically weighted member mounted for relative angular adjustment thereon and a pulley connected with said end of the shaft for translatory movement relative thereto and for rotating said shaft as said pulley is turned, said compound eccentric having a net eccentricity proportional to the resultant of the centrifugal forces produced by said eccentric weights for all positions thereof and being effective in response to the angular adjustment of said eccentrically weighted member to translate the center of the pulley to a position in substantial coincidence with the axis about which the shaft will gyrate when rotated as determined by said eccentric weights in any of said positions.

5. Gyrating mechanism comprising a shaft rotatably mounted in a structure adapted to be gyrated and having an eccentric weight thereon, an eccentrically weighted member carried by said shaft for relative angular movement thereon, a pulley carrying member connected with said shaft for translatory movement relative thereto and for rotating said shaft as said pulley is turned, and an eccentric carried by each of said members, said eccentrics each having a magnitude proportional to the mass of a different one of said eccentric weights and being compounded to produce a resultant eccentricity which is proportional in magnitude and corresponds in direction to the magnitude and direction of the resultant of the centrifugal forces produced by said eccentric weights whereby the angular adjustment of said eccentrically weighted member translates said pulley relative to said shaft and to a position in which the center of the pulley is in substantial coincidence with the axis about which the shaft will gyrate when rotated.

6. Gyrating mechanism comprising a shaft rotatably mounted in a structure adapted to be gyrated and having an eccentric weight thereon, an eccentrically weighted member carried by said shaft for relative angular adjustment thereon, said eccentrically weighted member including an eccentrically bored portion extending beyond and exposing an end portion of said shaft, a pulley carrying member having an eccentric portion mounted in said bore, and means connecting the eccentric portion of the pulley carrying member with said end of the shaft for translatory movement relative thereto and for rotating said shaft as said pulley is turned, said eccentric portion and bore constituting a compound eccentric having a net eccentricity for all positions of said weights which renders the angular adjustment of said weighted member effective to translate said pulley relative to said shaft and to a position in which the center of the pulley is in substantial coincidence with the axis about which the shaft will gyrate when rotated.

7. Gyrating mechanism comprising a shaft rotatably mounted in a structure adapted to be gyrated and having an eccentric weight thereon, an eccentrically weighted member carried by said shaft for relative angular adjustment thereon, said eccentrically weighted member including an eccentrically bored portion extending beyond and exposing an end portion of said shaft, a pulley carrying member having an eccentric portion mounted in said bore, and means connecting the eccentric portion of the pulley carrying member with said end of the shaft for translatory movement relative thereto and for rotating said shaft as said pulley is turned, said eccentric portion and bore each having an eccentricity proportional to the mass of a different one of said eccentric weights thereby producing a resultant eccentricity which is proportional in magnitude and corresponds in direction to the magnitude and direction of the resultant of the centrifugal forces produced by said eccentric weights whereby the angular adjustment of said eccentrically weighted member translates said pulley relative to said shaft and to a position in which the center of the pulley is in substantial coincidence with the axis about which the shaft will gyrate when rotated.

8. A vibrating system comprising a body to be vibrated, a shaft bearing supported by a wall portion of said body in substantially symmetrical relation with respect to the opposite sides of said wall portion, a shaft mounted in said bearing, eccentric weights carried by said shaft for relative angular adjustment thereon, a pulley connected with said shaft for translatory movement relative thereto and for rotating said shaft as said pulley is turned, and compound eccentric means rendering the angular adjustment of one of said eccentric weights effective to translate said pulley relative to said shaft and to a position in which the center of the pulley is in substantial coincidence with the axis about which the shaft will gyrate when rotated.

9. A vibrating system comprising a body to be vibrated, a pair of axially spaced shaft bearings supported by opposed wall portions of said body in substantially symmetrical relation with respect to the opposite sides of said portions, a shaft eccentrically weighted intermediate its ends and having its opposite end portions journaled in said bearings, eccentric weights carried by the end portions of said shaft for angular adjustment thereon, a pulley connected with one end of said shaft for translatory movement relative thereto and for rotating said shaft as said pulley is turned, and compound eccentric means rendering the angular adjustment of the proximate one of said eccentric weights effective to translate said pulley relative to said shaft and to a position in which the center of the pulley is in substantial coincidence with the axis about which the shaft will gyrate when rotated.

LEO TEPLOW.